Feb. 9, 1954 J. J. WALDHERR 2,668,788
METHOD OF FORMING A HOLLOW CORE PLYWOOD DOOR
Filed Dec. 16, 1948 2 Sheets-Sheet 1
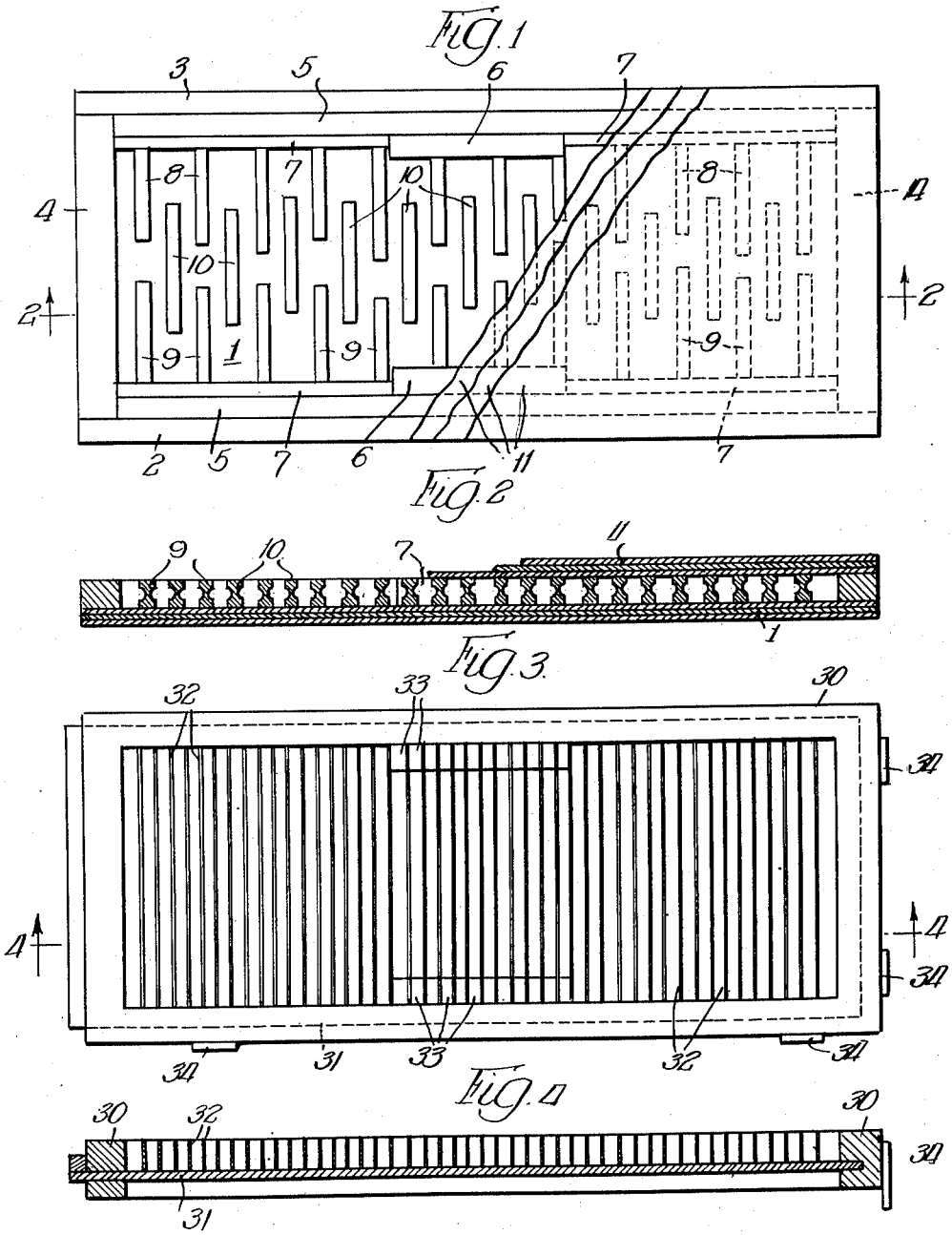
INVENTOR.
Joseph J. Waldherr,
BY
ATTYS Feb. 9, 1954 J. J. WALDHERR 2,668,788
METHOD OF FORMING A HOLLOW CORE PLYWOOD DOOR
Filed Dec. 16, 1948 2 Sheets-Sheet 2
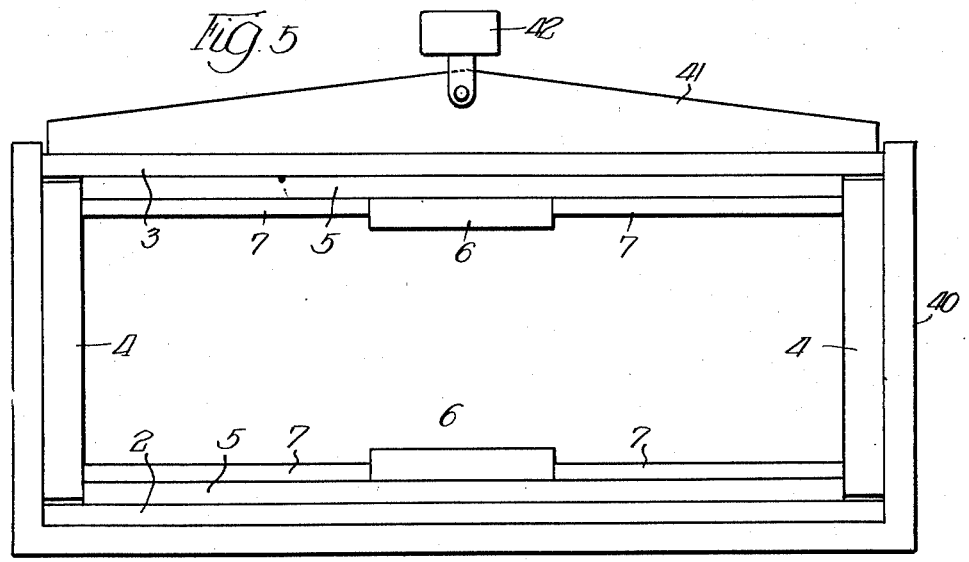
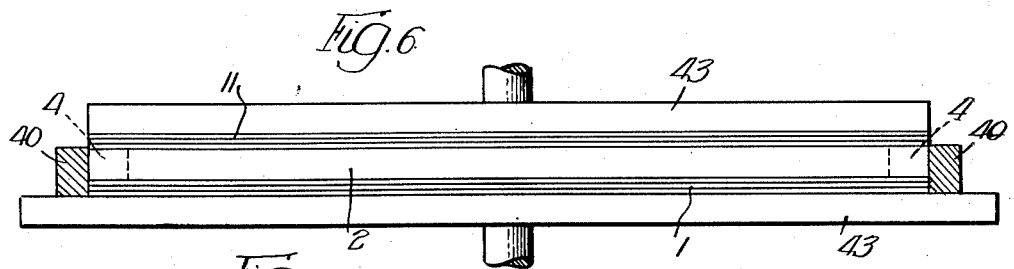
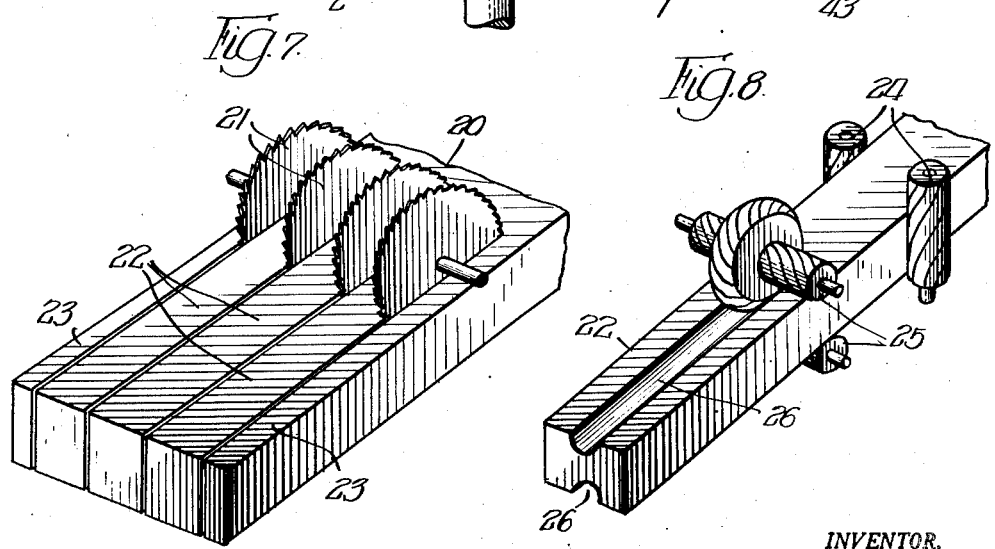
INVENTOR.
Joseph J. Waldherr, Patented Feb. 9, 1954

2,668,788

UNITED STATES PATENT OFFICE 2,668,788

METHOD OF FORMING A HOLLOW CORE PLYWOOD DOOR

Joseph J. Waldherr, Marshfield, Wis., assignor to Roddis Plywood Corporation, Marshfield, Wis., a corporation of Wisconsin Application December 16, 1948, Serial No. 65,677

4 Claims. (Cl. 154—118)

This invention relates to hollow core plywood doors and panels, and has for its principal object a new and improved structure of this type and a new and improved method of forming the same.

It is a main object of the invention to provide a method of making a hollow core plywood door or panel, utilizing waste saw lumber in the formation of the core.

Another object of the invention is to provide a new and improved hollow core plywood door or panel, the core of which is composed of waste saw lumber.

Another object of the invention is to provide an economic process for utilizing waste saw lumber in the formation of hollow cores or doors, panels and the like.

Another object of the invention is to provide a core for hollow core doors and the like, which, though composed of waste or scrap saw lumber of random length, is strong and not subject to warping or shrinkage.

Further objects of the invention not specifically mentioned here will be apparent from the detailed description and claims which follow, reference being had to the accompanying drawings in which a preferred embodiment of the invention is shown by way of example and in which Fig. 1 is a plan view of a door containing the core of the present invention, with parts broken away the better to show the construction;

Fig. 2 is a cross sectional view taken substantially along the line 2—2 of Fig. 1, looking in the direction of the arrows;

Fig. 3 is a plan view of the core assembly jig;

Fig. 4 is a cross sectional view taken substantially along the line 4—4 of Fig. 3, looking in the direction of the arrows;

Fig. 5 is a plan view, partly diagrammatic, illustrating the press assembly frame;

Fig. 6 is an elevational view showing the press assembly frame between the platens of a press;

Fig. 7 is a diagrammatic view illustrating a step in the process of forming the core; and Fig. 8 is a diagrammatic view illustrating another step in the process of forming the core.

Hollow core plywood doors usually consist of a rectangular outer frame of saw lumber of the same characteristics as the facing panels of the door, between the inner edges of which frame are core members most generally composed of lumber sawed and fitted together to form a plurality of closed cells extending between the facing panels of the structure. These prior art structures, while generally quite satisfactory from a weight and wearing quality standpoint, are expensive to build because of the numerous exacting operations required in the formation of the core.

There accumulates around a plywood mill a considerable quantity of scrap veneer, and in the co-pending application of Matthew G. Faussner, Serial No. 765,777, filed August 2, 1947, now Patent No. 2,622,999, there is disclosed a method of utilizing such waste material in the formation of hollow core doors, panels and the like.

There also accumulates around a plywood mill a substantial quantity of scrap saw lumber which has heretofore been burned as waste. The present invention seeks to utilize such waste saw lumber in the formation of hollow cores for doors, panels and the like.

In the prior art of which I am aware, numerous efforts have been made to utilize random length waste saw lumber in the formation of solid cores for doors, panels and the like, with considerable success; however, previous efforts to utilize such waste material in the formation of hollow core doors, panels and the like, have not been too successful for the reason that the labor involved in utilizing such material in the formation of the structure has been so great that the final cost of the structure has been prohibitive. The present invention solves this problem by providing a process which utilizes waste saw lumber in the formation of cores for hollow doors with a minimum of labor, thereby keeping the cost of the finished product at a reasonable figure.

In the working up of the waste material to form core blocks for the doors, the random lengths of waste saw lumber are first cut to uniform dimension in any preferred manner, such as by a gang saw, and the individual blocks thus formed run through a stickling machine which finishes the blocks to uniform width and height accurate to within very close limits. If desired, by providing the sticking machine with suitable cutters, grooves can be cut into the side of the blocks to give them essentially I cross sections, thereby to reduce the weight of the blocks and consequently the weight of the finished door or panel. The blocks so formed are laid up into a desired core pattern in a suitable jig adjacent the press in which the doors are to be finished. The pattern so formed and the jig are subsequently registered with a door frame laid up in the press frame and dropped into place thereon in a minimum of time, so that the operations of removing a finished door and laying up the parts for a succeeding door in the press frame can readily be accomplished within the curing time of the press so that the production of the press is maintained at or near capacity.

As a result of this procedure, strong, lightweight doors can be produced economically with a minimum of manpower and equipment.

The doors so formed preferably consist of a pair of plywood facing panels each having three plies, the outer plies of which are of a desired finish wood, such as oak, mahogany, walnut, maple, etc., and the inner plies of which are a cheaper wood selected for strength. The two face panels of the door are spaced apart by a hollow rectangular frame consisting of side rails extending from end to end of the door, and end rails abutting the inside faces of the side rails and extending therebetween. The side and end rails are preferably composed of the same wood as the facing panels, although other woods may be used if desired. Within the hollow rectangle so formed are reinforcing members which abut against the inside edges of the end rails, and lock blocks which provide solid wood into which locks and latches may be mortised in the usual manner. The lock blocks are spaced within the door by supporting members abutting thereagainst and against the end rails.

Fitted in between the hollow rectangle so formed are the core blocks laid in spaced-apart relation, with the longitudinal median lines of the individual blocks extending transversely of the door. Alternate rows of blocks contain two or more individual blocks in substantial alignment longitudinally, with the outer ends of these blocks abutting against or in close proximity to the inner edges of the supporting members of the framework. Intervening rows of core blocks are disposed inwardly of the sides of the door and with their ends overlapping but spaced from the ends of the blocks in the first rows. This arrangement provides ample support for the facing panel sections intermediate of the door frame with the result that the door is strong and not subject to warping or distortion.

Referring now to the drawings in more detail, particularly Figs. 1 and 2, the door will be seen to be composed of a first facing panel 1, preferably of three-ply plywood, with the grain of the outer two layers extending longitudinally of the door and the grain of the middle ply extending transversely thereof. Around the edges of this panel are side rails 2 and 3 which extend from end to end of the panel 1. Fitted between and abutting against the inner edges of said rails 2 and 3 are end rails 4 which, with the side rails, are preferably composed of the same wood as the lowermost ply in the facing panel 1.

Fitted alongside of the side rails 2 and 3, and abutting against the inner edges of the end rails 4, are reinforcing rails 5 which may be composed of any type of wood preferably selected for its strength and durability rather than for its ability to take finishes. Located against the inner edges of the reinforcing rails 5 are lock blocks 6 which are positioned in the door and held with respect to the end rails 4 by supporting rails 7 which abut against the lock blocks and the end rails.

Fitted within the hollow rectangle so formed are a plurality of core blocks 8 which, in the example shown, are arranged in rows 9, each of which contains two core blocks located with their outer ends either abutting against or in close proximity to the supporting rails 7, the rows 9 being spaced apart a substantial distance. Intervening between the rows 9 are rows 10, which, in the example shown, contain a single core block disposed approximately midway between the rows 9 and with the ends of the block overlapping but spaced from the inner ends of the blocks in rows 9. All of the blocks in the core are of random length but of uniform height and width. While two blocks are shown in alternate rows, with rows containing a single block intervening, this particular pattern may be modified within the teachings of the invention and two or more individual blocks placed in each of the rows, preferably, however, with the ends of the block overlapping in substantially the manner shown.

Placed upon the frame and core so formed and glued to the frame members, lock blocks and core blocks, is a second facing panel 11, preferably identical with the first panel 1. After the structure so formed has been pressed and subjected to heat to set the glue, the structure is solid and strong and not subject to warpage or shrinkage. Doors constructed as shown weigh from thirty to thirty-five pounds for a particular size, depending upon the kind of wood employed, as contrasted with ninety to ninety-five pounds for a door of the same size and of the same wood but having a solid core.

In the door illustrated, the core blocks are placed in rows extending transversely of the door, which is a preferred arrangement. This arrangement is not of the essence of the present invention, and the particular pattern in which the core blocks are arranged is subject to variations within the teachings of the invention.

In the formation of the door just described, random lengths of waste saw lumber of varying width and thickness are first reduced to blocks of substantially the same thickness in any preferred manner. In Fig. 7 such a block 20 is being shown as passing through a gang saw 21 which produces uniform dimension, random length, usable core blocks 22, and smaller scrap members 23 which are discarded. While gang sawing as illustrated affords a cheap, rapid method of forming these blocks, other arrangements for forming the same may be used within the teachings of the invention.

Not all of the waste lumber accumulated will be wide enough to be cut into two or more usable core block blanks, but rather much of this waste will be of such width and thickness as to permit performing the next step of the process without any preliminary cutting. Although the core blocks are of random length, they must be short enough to fit between the frame of the door and preferably are slightly less than half as long as the distance between the side members of the frame. Should the waste include lumber of greater length than can be used, it will, of course, have to be cut into shorter length blocks before the blocks can be assembled in this core pattern; however, most of the waste will work up into usable length blocks.

Individual blocks so formed are next fed into a sticking machine in which cutters 24 and 25 face the four edges of the block to accurate dimension. In order to reduce the weight of the core blocks and door in the example shown, cutters 25 are arranged to cut grooves 26 in the sides of the block, giving it essentially an I shape in cross section. As shown, the grooves 26 are semicircular; however, any desired shape of grooves may be used or the grooves may be omitted entirely, if desired. The random length core blocks so formed are ready for assembly in the core pattern.

As will be seen in Figs. 3 and 4, I have provided a jig in which the core pattern may be laid up. As shown, this jig consists of a rectangular frame 30 which contains a slidable tray 31 and a plurality of spacers 32 which divide the frame into a plurality of transversely extending slots or pockets. The inside width of the frame is preferably approximately the same as the core pattern, although, if desired, cores of varying widths may be laid up in a single jig. Located in the pockets formed between spacers 32 and adjacent the center of the jig are blocks 33 which space the core blocks in these pockets inwardly so that they will fit between the lock blocks 6 in the door structure.

Fitted upon the one end and one side of the frame 30 are guide blocks 34 by which the frame is registered with a press frame, as will presently appear. Frame 30, spacers 32 and tray 31, and the blocks 33 and 34 may all conveniently be formed of wood, preferably plywood, so that when a core pattern is laid up in the frame it will be sufficiently light to enable it to be readily lifted and placed in registration with the press frame, as will presently appear.

The particular type of press frame employed will, of course, depend upon the type of press being employed to clamp the structure and set the glue therein. In one instance, the platen of the press is twice as long as the press, with the result that one end of it projects from the side of the press to permit removing a completed door and laying up the parts of the next door while the structure at the other end of the platen is being pressed and cured. In other presses, a plurality of platens and structures are stacked one above the other in face-to-face relation and pressed and cured simultaneously. In either instance, a press frame such as is shown in Fig. 5 will be employed. This frame consists of a rectangular structure 40, three sides of which are fixed and the fourth side 41 is movable and adapted to be forced towards the opposite side, as illustrated by the ram 42.

In laying up a door structure, a facing panel, such as 1, is glued on its upper face and laid within the frame 40. Within the frame and on this panel, side rails 3, end rails 4, reinforcing rails 5, lock blocks 6, and supporting rails 7 are laid in the positions shown and the frame then closed to move side 41 laterally, thereby to register side rails 3 against the end rails 4. The jig shown in Fig. 3 and core pattern laid up in it are then registered with the frame 40, being located thereon by engaging the blocks 34 with the outer edges of the frame on one side and at one end. The tray 31, which forms the bottom of the jig, is then moved with respect to the frame 30 of the jig to open the bottom of the individual transverse pockets in the jig and permit the core blocks to drop onto the upper surface of the facing panel 1 and between the side blocks 7 and end rails 4 of the door frame.

As shown, the tray 31 is adapted to move longitudinally of the frame 30. In instances where it will prove more convenient because of space conditions around a press, the tray may be arranged to move transversely of the frame 30.

As soon as all of the core blocks have thus been deposited on the facing panel 1, tray 31 is moved back into the frame 30 and the jig removed from the press frame for re-loading. In the event that any of the core blocks, in falling out of the jig and onto the facing panel 1, become misplaced, it is a simple matter for the operators to arrange them into the desired pattern. In most instances, however, with the jig as shown, the core blocks will be properly placed and little or no arranging has been found to be necessary.

The other face panel 11 with glue on its lower face is then registered with the door frame and core members in the press frame 40 and the frame and contents moved into registration with the platens diagrammatically illustrated in Fig. 6 as 43 and 44, through which heat and pressure are applied to the assembly to set the glue and bind the individual parts of the door securely together. After the glue has been cured, the door is removed from the press and press frame and trimmed to accurate dimension and finished in the usual manner, such as by sanding.

It has been found that the foregoing method produces high quality doors economically. One operator and a sticking machine can produce in excess of 10,000 feet of random length core blocks in an eight-hour day. One lay-up operator having two lay-up jigs can lay up cores sufficiently rapidly to have a completed pattern ready in the jig each time the press frame is available for re-loading. In one instance, utilizing an electronic press which cured and set the glue in approximately one minute, this one operator had no difficulty in laying up core patterns for one-half of the doors being cured in the press, the other side of the press being utilized to cure doors of a different pattern. One press crew of five operators kept the press busy with a minimum of lost time in changing from one end of the platen to the other, laying up in the press frames one or the other type of doors during approximately one minute curing time of the press.

Waste saw lumber, which is in small pieces of random length but otherwise perfectly good sound lumber, is utilized by the process of the present invention to form cores for doors rather than as fuel in the boiler plant. The labor involved in transforming the waste material into useful articles is sufficiently low to keep the total cost of the finished product at a reasonable figure. The process requires a minimum of special equipment and a minimum of skill on the part of the operators.

Throughout the foregoing description, I have referred to the articles as doors. Obviously hollow cores for panels and the like may be made in the same manner and I am not to be limited to the doors described by way of example.

While the steps of the process have been outlined in detail, this has been done by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. The method of utilizing waste saw lumber in the construction of hollow core plywood doors which comprises: forming from said waste saw lumber random length blocks of essentially I section and of uniform height and width; arranging a plurality of said blocks in spaced apart relation in a core pattern; laying up a door frame on the upper face of a plywood facing panel that has glue applied thereto; registering said plurality of core blocks in said pattern within said frame and depositing the blocks upon said panel; placing a second facing panel that has glue on one face on said frame and core blocks with the glue face engaging the frame and blocks; and clamping and heating said assembly to cure the glue and thereby bond the door parts together.

2. The method of utilizing waste saw lumber in the construction of hollow core plywood doors which comprises: forming from said waste saw lumber random length core blocks of uniform height and width; arranging a plurality of said core blocks in a core pattern in which the longitudinal median lines of the blocks extend transversely of the core and in which the individual blocks are spaced apart longitudinally and transversely in the core; laying up a hollow rectangular door frame on the upper glued face of a plywood facing panel; registering said core pattern with said frame and depositing the pattern on the panel within the frame; placing over said frame and core blocks a second plywood facing panel which has glue on its lower face; and clamping and heating said assembly to cure the glue and thereby bond the door parts together.

3. The method of forming a hollow core plywood door from random length core blocks which comprises: laying up the core blocks in substantially parallel, spaced-apart rows, with the adjacent ends of the blocks in one row overlapping the ends of the blocks in the adjacent rows; laying up on the face of a plywood facing panel, to the upper face of which glue has been applied, a hollow rectangular frame having outside dimensions substantially the same as the panel; registering the laid-up core blocks with said frame; dropping the core blocks into position within said frame and on said panel; placing a second plywood facing panel, to the lower face of which glue has been applied, over said frame and core blocks; clamping the assembly; and subjecting the clamped assembly to heat to set the glue.

4. The method of forming hollow core plywood doors which comprises: cutting random length scrap saw lumber to uniform height and width; laying up said core blocks in substantially parallel, spaced-apart rows, with adjacent ends of the blocks in one row overlapping the ends of the blocks in the adjacent rows; placing a panel of facing plywood that has glue on one face, glue face up, laying up on said panel a door frame having outside dimensions substantially the same as the panel; placing said laid up core blocks on the glued face of said panel within said frame; moving the outer ones of said core blocks into substantial abutment with the inside edges of said door frame; registering a second facing panel which has glue on its lower face with said door frame and core blocks; and applying heat and pressure to the assembly to cure the glue and thereby bind the parts together.

JOSEPH J. WALDHERR.

References Cited in the file of this patent

UNITED STATES PATENTS

| Number | Name | Date |
| --- | --- | --- |
| 1,911,374 | Loetscher | May 30, 1933 |
| 2,073,896 | Loetscher | Mar. 16, 1937 |
| 2,191,070 | Cone | Feb. 20, 1940 |
| 2,243,022 | Thomas | May 20, 1941 |
| 2,302,487 | Beiger et al. | Nov. 17, 1942 |
| 2,385,352 | Davis | Sept. 25, 1945 |
| 2,401,281 | Webb | May 28, 1946 |
| 2,479,870 | Rundquist | Apr. 23, 1949 |
| 2,531,375 | Delegard et al. | Nov. 21, 1950 |